United States Patent
Chiarandini et al.

(10) Patent No.: US 11,567,987 B2
(45) Date of Patent: Jan. 31, 2023

(54) METHODS, SYSTEMS, AND MEDIA FOR IDENTIFYING ABUSIVE USER ACCOUNTS BASED ON PLAYLISTS

(71) Applicant: Google LLC, Mountain View, CA (US)

(72) Inventors: Luca Chiarandini, Zürich (CH); Varun Sharma, Thalwil (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/976,837

(22) PCT Filed: Nov. 6, 2019

(86) PCT No.: PCT/US2019/060075
§ 371 (c)(1),
(2) Date: Aug. 31, 2020

(87) PCT Pub. No.: WO2020/106452
PCT Pub. Date: May 28, 2020

(65) Prior Publication Data
US 2021/0004398 A1  Jan. 7, 2021

Related U.S. Application Data

(60) Provisional application No. 62/769,915, filed on Nov. 20, 2018.

(51) Int. Cl.
*G06F 16/45* (2019.01)
*G06F 16/435* (2019.01)
(Continued)

(52) U.S. Cl.
CPC ........ *G06F 16/45* (2019.01); *G06F 16/24578* (2019.01); *G06F 16/435* (2019.01);
(Continued)

(58) Field of Classification Search
CPC .... G06F 16/45; G06F 16/435; G06F 16/4387; G06F 16/24578
(Continued)

(56) References Cited

U.S. PATENT DOCUMENTS 8,949,874 B1 *  2/2015  Li ..................... H04N 21/4828
                                                    725/14
9,723,367 B1    8/2017  Long et al.
(Continued)

OTHER PUBLICATIONS

Kaushal, R. et al., "KidsTube: Detection, Characterization and Analysis of Child Unsafe Content & Promoters on YouTube", In Computing Research Repository, Aug. 21, 2016, pp. 1-8.

*Primary Examiner* — Kimberly L Wilson
(74) *Attorney, Agent, or Firm* — Byrne Poh LLP (57) ABSTRACT

Methods, systems, and media for identifying abusive user accounts based on playlists are provided. In accordance with some embodiments of the disclosed subject matter, a method for identifying abusive content is provided, the method comprising: determining at least one feature associated with a playlist created by a user-generated channel; calculating a playlist score associated with the playlist based on a playlist classifier, wherein the playlist classifier comprises a function that maps the at least one feature to the playlist score; calculating a channel score associated with the user-generated channel based at least on the calculated playlist score; determining that one or more content items associated with the user-generated channel is to be demoted based on the calculated channel score, wherein the one or more content items comprises the playlist; and causing the one or more content items to be demoted.

18 Claims, 7 Drawing Sheets

(51) Int. Cl.
*G06F 16/438* (2019.01)
*G06N 20/00* (2019.01)
*G06F 16/2457* (2019.01)
*H04N 21/266* (2011.01)

(52) U.S. Cl.
CPC ......... *G06F 16/4387* (2019.01); *G06N 20/00* (2019.01); *H04N 21/266* (2013.01); *H04N 21/26603* (2013.01)

(58) Field of Classification Search
USPC ........................................................ 707/728
See application file for complete search history.

(56) References Cited

U.S. PATENT DOCUMENTS

| | | | | |
|---|---|---|---|---|
| 2009/0013041 A1* | 1/2009 | Farmer | ............ | G06F 16/24578 709/204 |
| 2016/0192006 A1* | 6/2016 | Alfishawi | ............ | H04N 21/812 725/32 |
| 2016/0360266 A1* | 12/2016 | Wilms | ................. | H04N 21/251 |

* cited by examiner

METHODS, SYSTEMS, AND MEDIA FOR IDENTIFYING ABUSIVE USER ACCOUNTS BASED ON PLAYLISTS

CROSS-REFERENCE TO RELATED APPLICATION

This application claims the benefit of U.S. Provisional Application No. 62/769,915, filed Nov. 20, 2018, which is hereby incorporated by reference herein in its entirety.

TECHNICAL FIELD

The disclosed subject matter relates to methods, systems, and media for identifying abusive user accounts based on playlists.

BACKGROUND

Keyword searching is an important tool that allows users to discover content on media content platforms. As such, great emphasis is placed on search engine optimization to cause content to appear earlier (or rank higher) in a search results list for certain keyword search queries. Content, such as a video content, that receives a high rank in a search results list is more visible to users, which can attract more visitors that may select the video content for consumption, accrue more watch time, and ultimately lead to increased revenue. However, bad actors can abuse this visibility by automatically creating hundreds or even thousands of playlists (sometimes referred to as "spam playlists") that are optimized to flood a search results list for popular keyword search queries. For example, each of these playlists can include unrelated, misleading, repetitive, racy, pornographic, infringing, and/or "clickbait" content to target unsuspecting users.

Existing approaches for controlling spam playlists are ineffective due to the sheer number of spam playlists. For example, in connection with video provision services, manual user reporting of individual spam playlists simply cannot address the thousands of new spam playlists that are automatically generated by abusive users on their respective user channels each day.

Accordingly, it is desirable to provide new methods, systems, and media for identifying abusive user accounts based on playlists.

SUMMARY

Methods, systems, and media for identifying abusive user accounts based on playlists are provided.

In accordance with some embodiments of the disclosed subject matter, a method for identifying abusive content is provided, the method comprising: determining at least one feature associated with a playlist created by a user-generated channel; calculating a playlist score associated with the playlist based on a playlist classifier, wherein the playlist classifier comprises a function that maps the at least one feature to the playlist score; calculating a channel score associated with the user-generated channel based at least on the calculated playlist score; determining that one or more content items associated with the user-generated channel is to be demoted based on the calculated channel score, wherein the one or more content items comprises the playlist; and causing the one or more content items to be demoted.

In some embodiments, the method further comprises: determining a set of features associated with a first plurality of playlists; and training the playlist classifier based on the determined set of features and a set of ground truth information.

In some embodiments, the method further comprises: determining at least one feature associated with a second plurality of playlists created by the user-generated channel; calculating a plurality of playlist scores each associated with a respective playlist of the second plurality of playlists based on the determined at least one feature associated with the second plurality of playlists; calculating an average playlist score of the user-generated channel by averaging the plurality of playlist scores; and calculating the channel score based on the average playlist score.

In some embodiments, calculating the channel score based on the calculated average playlist score comprises calculating the channel score based on a function that maps the average playlist score to the channel score.

In some embodiments, the method further comprises: calculating a plurality of average playlist scores corresponding to a plurality of user-generated channels; partitioning the plurality of user-generated channels into a plurality of partitions based on the plurality of average playlist scores; and determining the function that maps the average playlist score to the channel score based on proportions of types of channels in each partition of the plurality of partitions.

In some embodiments, the method further comprises: receiving a search query; generating a plurality of search results in response to the search query, wherein at least a portion of the plurality of search results correspond to the one or more content items; and causing at least a portion of the plurality of search results to be presented based on the demotion.

In accordance with some embodiments of the disclosed subject matter, a system for identifying abusive content is provided, the system comprising: a hardware processor that is configured to: determine at least one feature associated with a playlist created by a user-generated channel; calculate a playlist score associated with the playlist based on a playlist classifier, wherein the playlist classifier comprises a function that maps the at least one feature to the playlist score; calculate a channel score associated with the user-generated channel based at least on the calculated playlist score; determine that one or more content items associated with the user-generated channel is to be demoted based on the calculated channel score, wherein the one or more content items comprises the playlist; and cause the one or more content items to be demoted.

In accordance with some embodiments of the disclosed subject matter, a non-transitory computer-readable medium containing computer-executable instructions that, when executed by a processor, cause the processor to perform a method for identifying abusive content is provided, the method comprising: determining at least one feature associated with a playlist created by a user-generated channel; calculating a playlist score associated with the playlist based on a playlist classifier, wherein the playlist classifier comprises a function that maps the at least one feature to the playlist score; calculating a channel score associated with the user-generated channel based at least on the calculated playlist score; determining that one or more content items associated with the user-generated channel is to be demoted based on the calculated channel score, wherein the one or more content items comprises the playlist; and causing the one or more content items to be demoted.

In accordance with some embodiments of the disclosed subject matter, a system for identifying abusive content is provided, the system comprising: means for determining at least one feature associated with a playlist created by a user-generated channel; means for calculating a playlist score associated with the playlist based on a playlist classifier, wherein the playlist classifier comprises a function that maps the at least one feature to the playlist score; means for calculating a channel score associated with the user-generated channel based at least on the calculated playlist score; means for determining that one or more content items associated with the user-generated channel is to be demoted based on the calculated channel score, wherein the one or more content items comprises the playlist; and means for causing the one or more content items to be demoted.

Optional features of one aspect may be combined with the other aspects. For example, optional features of the method aspect described above may be combined with any of the system aspects.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for identifying abusive user accounts based on playlists are provided.

In some embodiments, the mechanisms described herein can be used to identify abusive user accounts (e.g., user channels) based on playlists. In some embodiments, a playlist can include one or more media content items, such as video clips, movies, audio clips, music, audiobooks, images, and/or any other suitable media content item(s). In some embodiments, the mechanisms described herein can collect information associated with playlists and aggregate the information into respective feature sets characterizing each playlist. In some embodiments, the mechanisms described herein can train (or re-train) a playlist classifier based on the aggregated feature sets and ground truth information differentiating relatively good playlists from relatively bad playlists. Accordingly, in some embodiments, the mechanisms described herein can provide a playlist classifier that accurately identifies abusive playlists so that an appropriate action can be taken. In this way, the embodiments disclosed herein address technical problems associated with the identification of abusive user accounts.

In some embodiments, the mechanisms described herein can calculate a playlist score for each playlist based on the trained (or re-trained) playlist classifier, where a playlist score can be a value that represents a relative goodness of a playlist. In some embodiments, the mechanisms described herein can then calculate a channel score for each user channel based on the playlist score(s), where a channel score can be a value that represents a relative goodness of a user-generated channel. For example, in some embodiments, the mechanisms described herein can calculate an average playlist score for each user channel and determine a corresponding channel score based on a function that maps an average playlist score to a channel score. In some embodiments, the mechanisms described herein can dynamically determine the function that maps an average playlist score to a channel score. Accordingly, in some embodiments, the mechanisms described herein can identify abusive user accounts based on the playlists that are created using those user accounts, which allows greater control and flexibility to take action to control abuse on a media content platform.

In some embodiments, the mechanisms described herein can demote one or more search results based on the calculated channel score(s). For example, in some embodiments, the mechanisms described herein can determine a user channel having a channel score that is below a predetermined threshold and can cause one or more media content items (e.g., playlists, videos, and/or any other suitable media content item) associated with the user channel to be demoted. In a more particular example, in some embodiments, the mechanisms described herein can lower a rank in which a demoted content item is present in an ordered list of search results, prevent a content item from being presented in a list of search results, prevent monetization of a content item in association with playback of the content item, and/or perform any other suitable action. Accordingly, in some embodiments, the mechanisms described herein can more comprehensively prevent abuse on media content platforms. That is, the embodiments described herein provide a technical method of filtering media that has been identified as abusive.

In some embodiments, the mechanisms described herein can iteratively re-train the playlist classifier, recalculate playlist scores for each playlist according to the re-trained playlist classifier, and recalculate channel scores for each user channel based on the recalculated playlist scores. Accordingly, in some embodiments, the mechanisms described herein can stay up-to-date with the most recent trends in keywords and abuse patterns and can dynamically control abuse on a media content platform.

In some embodiments, the mechanism described herein can improve media content classification technology and search engine technology. For example, in some embodiments, the mechanisms described herein can improve on existing solutions by classifying user channels based at least in part on the playlists that they create such that existing and newly generated content created by user channels can be identified as being abusive and can be demoted.

These and other features for identifying abusive user channels based on playlists are described further in connection with FIGS. 1-7.

Figure 1:
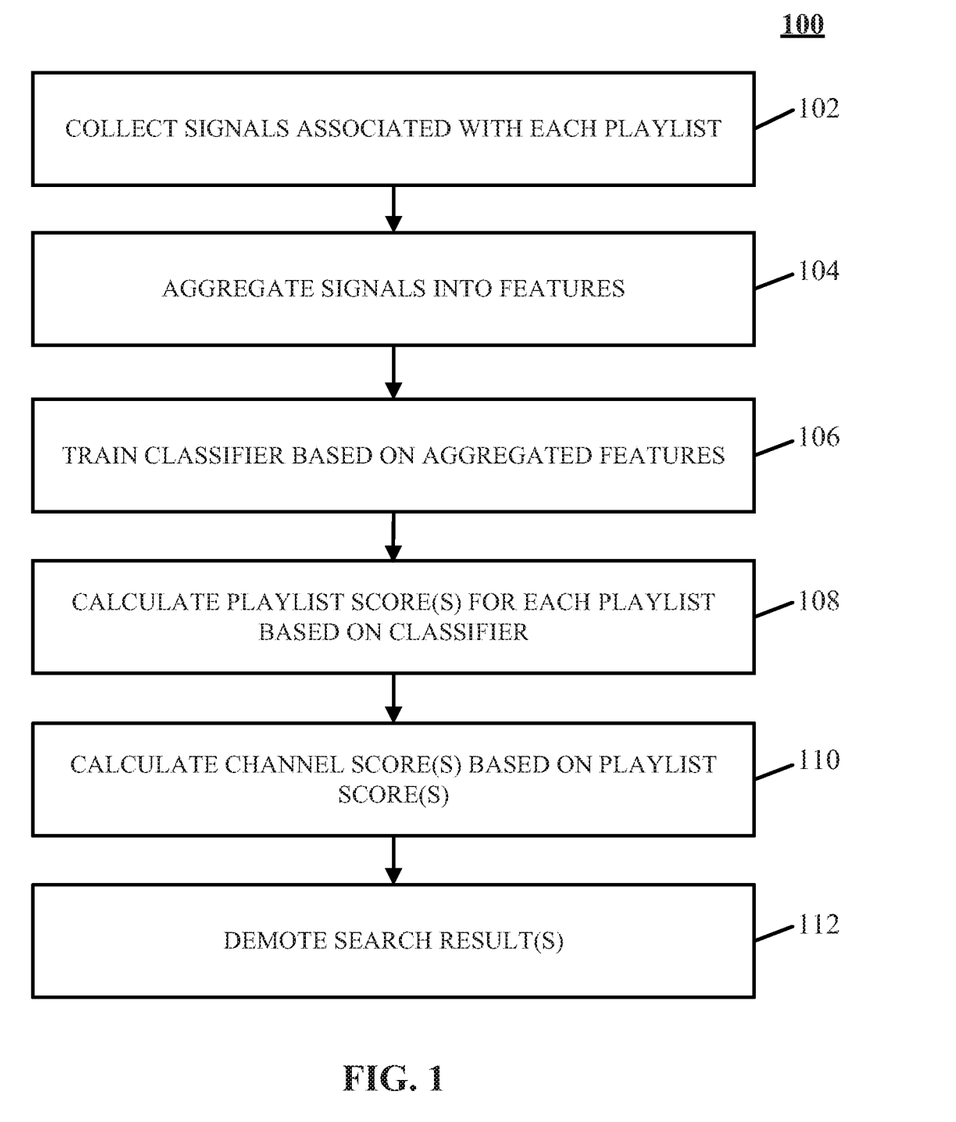
FIG. 1 shows an illustrative example of a process for identifying abusive user channels based on playlists in accordance with some embodiments of the disclosed subject matter.

Turning to FIG. 1, an example 100 of a process for identifying abusive user channels based on playlists in accordance with some embodiments of the disclosed subject matter is shown. As illustrated, blocks of process 100 can be executed by one or more servers, as shown in and described below in connection with FIGS. 6 and 7, and/or any other suitable computing device(s).

At 102, process 100 can collect information associated with each of a plurality of playlists. In some embodiments, a playlist can include a list of one or more media content items. For example, in some embodiments, a media content item can include video content items (e.g., video clips, movies, video playlists, and/or any other suitable video content items), audio content items (e.g., audio clips, music, audiobooks, audio playlists, and/or any other suitable audio content items), images, and/or any other suitable media content items. In some embodiments, the list of media content items can be an ordered list that can be played in sequential order, played in shuffled order, or a combination thereof.

In some embodiments, information associated with a playlist can include information about the playlist itself, information associated with a user account that created the playlist (e.g., a playlist creator), information associated with the contents of the playlist (e.g., the videos included in the playlist and associated video-level signals), information associated with the user channel(s) that uploaded the contents of the playlist, and/or any other suitable information. For example, information associated with a playlist can include a quality score of the playlist, a number of content items included in the playlist, an indication of a technique that was used to create or upload the playlist (e.g., through a web browser, through a dedicated application of a media content platform, through an application program interface (API), etc.), a total amount of time that users have watched or consumed the contents of the playlist (e.g., a total watch time of the playlist), a recent watch time of the contents of the playlist (e.g., within the past 30 days), a quality score of the user channel that created the playlist, an activity level of the user channel that created the playlist (e.g., an active user channel, an inactive user channel, etc.), a suspension status of the user account that created the playlist, a number of subscribers of the user channel that created the playlist, a quality score of each content item in the playlist, a total and/or recent watch time of each content item of the playlist, a quality score of a user channel that uploaded each content item of the playlist, an activity level of the user channel that uploaded each content item of the playlist, a suspension status of the user channel that uploaded each content item of the playlist, a number of subscribers of the user channel that uploaded each content item of the playlist, and/or any other suitable information.

In some embodiments, process 100 can collect the information associated with a playlist in any suitable manner. For example, in some embodiments, process 100 can collect the information from one or more local databases. Additionally or alternatively, in some embodiments, process 100 can collect the information from one or more remote sources, such as a remote server.

At 104, process 100 can determine one or more classifier features for each playlist based on the collected information. In some embodiments, a feature can characterize a playlist with respect to one or more elements of the collected information. In some embodiments, process 100 can determine a feature of a playlist based on collected information in any suitable manner. For example, in some embodiments, process 100 can derive a feature by using one or more statistics (e.g., mean, median, minimum, maximum, quantile, standard deviations, distributions, top-N, etc.) of one or more elements of the collected information. In some embodiments, process 100 can store each feature as a vector of values having any suitable number of dimensions.

In some embodiments, one or more features of a playlist can be used to classify the playlist into one of a plurality of playlist types. In particular, in some embodiments, a feature of a playlist can also correlate to a playlist type, and detection of the feature in the playlist can indicate membership (or non-membership) of the playlist in the playlist type. For example, the probability that a playlist belongs to a particular playlist type can be determined by identifying one or more features that are correlated with the playlist type from the features associated with the playlist, determining the probability that the playlist belongs to the playlist type based on each relevant feature, and combining the probabilities for all relevant features. In some embodiments, a score can be assigned to the playlist corresponding to the combined probability.

At 106, process 100 can train a playlist classifier to classify a playlist into one of a plurality of playlist types. In some embodiments, a playlist classifier can include a function that maps one or more features of a playlist to a playlist type. For example, in some embodiments, a playlist classifier can receive one or more features (e.g., one or more feature vectors) and/or any other suitable information as input and output one or more values representing a determined playlist type. In a more particular example, in some embodiments, the playlist classifier can output a score representing a type of playlist, such as a value between 0 and 1 where values closer to 0 can represent a "GOOD" playlist and where values closer to 1 can represent a "BAD" playlist. The score can also represent a quality score of the playlist (e.g., a playlist score) in some embodiments. In some embodiments, a playlist classifier can be any suitable type of classifier, such as a neural network, a random forest algorithm, a support vector machine, a logistic regression, and/or any other suitable type of classifier.

In some embodiments, process 100 can train a playlist classifier in any suitable manner. For example, in some embodiments, process 100 can train a playlist classifier using the determined features, a set of ground truth information, and/or any other suitable information. In some embodiments, ground truth information can include a set of training playlists and one or more labels indicating a playlist type of each of the training playlists. For example, in some embodiments, the ground truth information can include a label for BAD playlists that indicates a rejected playlist, a playlist that has been created by a suspended channel, and/or a playlist having any other suitable feature(s) that should be classified as being a BAD playlist. As another example, in some embodiments, the ground truth information can include a label for GOOD playlists that indicates that a playlist created by a user channel with at least one video and having above a predetermined quality score (e.g., a quality score of at least 3.5), a playlist created by a user channel having over a predetermined number of subscribers (e.g., a channel having at least 15,000 subscribers), a playlist created by a user channel that is within a top percentage of all user channels in terms of subscribers (e.g., top 1% of all user accounts), and/or a playlist having any other suitable feature(s) that should be classified as being a GOOD playlist. As yet another example, in some embodiments, the ground truth information can include a label for GRAY playlists that indicates that a playlist that should not be classified as being either a BAD playlist or a GOOD playlist, but should be classified as being a GRAY playlist. In other words, the ground truth information can indicate that all playlists that are not classified as being a BAD playlist or a GOOD playlist should be classified as being a GRAY playlist in some embodiments. It is noted that, in some embodiments, the ground truth information can include any other suitable label(s) indicating that a playlist having any suitable feature(s) should be classified as a playlist of a given playlist type. In some embodiments, the ground truth information can include any other suitable information.

In some embodiments, the ground truth information can include penalty information associated with each label. In some embodiments, the penalty information can indicate a penalty that is given for misclassification of a playlist into a playlist type corresponding to the label. For example, in some embodiments, the penalty information can indicate that a relatively large penalty (e.g., a penalty of 10) is given for misclassification of a playlist as being a GOOD playlist. As another example, in some embodiments, the penalty information can indicate that a relatively small penalty (e.g., a penalty of 0.1) is given for misclassification of a playlist as being a GRAY playlist. In some embodiments, a playlist classified as a GRAY playlist can be presumed to be good, but with a smaller penalty for misclassification than if the playlist was misclassified as being a GOOD playlist. As yet another example, in some embodiments, the penalty information can indicate that a mid-range penalty (e.g., a penalty of 1.0) is given for misclassification of a playlist as being a BAD playlist. In some embodiments, the penalty information can indicate any suitable penalty for misclassification of a playlist and/or any other suitable information.

Additionally, in some embodiments, process 100 can validate a trained playlist classifier in any suitable manner. For example, in some embodiments, the ground truth information can include a set of validation playlists to validate the trained classifier against the labels included in the ground truth information. In some embodiments, the set of training playlists and the set of validation playlists can include the same playlists, different playlists, or any suitable combination thereof.

In some embodiments, the ground truth information can exclude playlists having one or more certain features from the set of training playlists and/or the set of validation playlists. For example, in some embodiments, playlists created by user channels or user accounts that have been suspended for reasons other than suspensions for providing spam or pornographic content can be excluded from the training set to prevent the playlist classifier from learning other suspension reasons (e.g., thereby allowing the playlist classifier to focus on spam content and/or pornographic content). As yet another example, in some embodiments, playlists created by the API in active user channels can be excluded from the training set to avoid confusing the playlist classifier. In some embodiments, the ground truth information can exclude playlists having any other suitable feature(s) from the training set.

In some embodiments, process 100 can receive the feature set, the ground truth information, and/or any other suitable information used in training the playlist classifier in any suitable manner. For example, in some embodiments, process 100 can retrieve the information from one or more local databases. Additionally or alternatively, in some embodiments, process 100 can receive the information from one or more remote sources, such as a remote server.

At 108, process 100 can calculate a respective quality score (e.g., a playlist score) for each of a plurality of playlists based on the trained playlist classifier. For example, in some embodiments, process 100 can input for each playlist one or more features of the playlist into the playlist classifier which can then output a respective playlist score for each playlist. In some embodiments, process 100 can calculate a playlist score such that 0≤playlist score ≤1, where a playlist score of 0 can represent relatively good playlists and a playlist score of 1 can represent relatively bad playlists (or abusive playlists). In some embodiments, process 100 can calculate a playlist score for each playlist in a media content platform. In some embodiments, process 100 can calculate a playlist score in any suitable manner.

At 110, process 100 can calculate a respective quality score (e.g., a channel score) for each of a plurality of user channels based on one or more playlists contained in the user channel. For example, in some embodiments, process 100 can calculate a channel score for each user channel in a media content platform. Alternatively, in some embodiments, process 100 can calculate a channel score for each user channel where a total amount of time that users have watched playlists of the user channel exceed a total amount of time that users have watched videos of the user channel within a predetermined amount of time (e.g., 30 days).

In some embodiments, process 100 can calculate a channel score for each user channel in any suitable manner. For example, in some embodiments, process 100 can calculate a channel score for a user channel in the manner shown and described in connection with FIG. 2.

Figure 2:
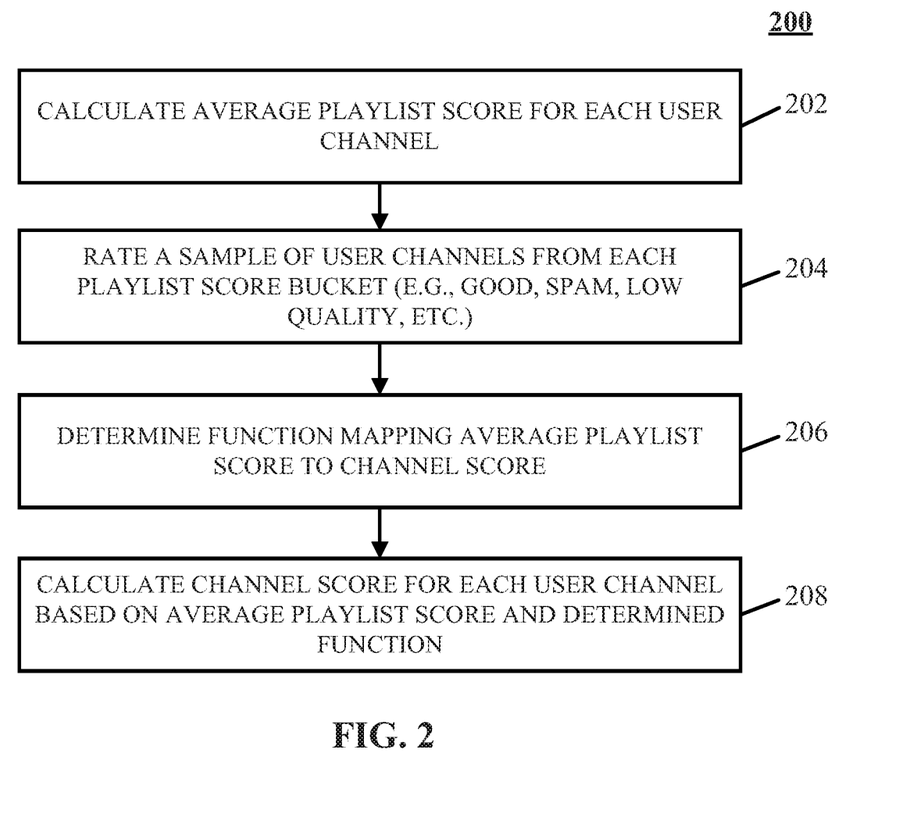
FIG. 2 shows an illustrative example of a process for calculating a channel score of a user channel based on playlist scores in accordance with some embodiments of the disclosed subject matter.

Turning to FIG. 2, an illustrative example 200 of a process for calculating a channel score of a user channel based on playlist scores in accordance with some embodiments of the disclosed subject matter is shown. As illustrated, blocks of process 200 can be executed by one or more servers, as shown in and described below in connection with FIGS. 6 and 7, and/or any other suitable computing device(s).

At 202, process 200 can calculate an average playlist score for each user channel. For example, in some embodiments, if a user channel has three playlists each having a respective playlist score, then process 200 can calculate an average playlist score of the user channel by determining the average of the three playlist scores. In some embodiments, process 200 can tune a calculated average playlist score based on one or more reviews. For example, in some embodiments, the reviews can include one or more reviews of one or more playlists of a user channel, one or more reviews of one or more videos included in one or more of the playlists, one or more reviews of the user channel, and/or any other suitable information.

At 204, process 200 can partition the user channels based on the calculated average playlist score and rate a sample of user channels from each partition. For example, in some embodiments, process 100 can partition user channels into buckets (e.g., partitions) corresponding to 0.1 increments in average playlist score and then rate each of a predetermined number of user channels (e.g., 100 user channels) from each bucket as a "SPAM" channel, a "LOW QUALITY" channel, a "GOOD" channel, and/or any other suitable type of channel. In some embodiments, a SPAM channel can correspond to a user channel that generally or predominantly creates BAD playlists as discussed above, spam content, misleading content, repetitive content, pornographic content, and/or any other suitable content, and/or any other suitable type of user channel. In some embodiments, a LOW QUALITY channel can correspond to a user channel that is generally borderline to be considered as a SPAM channel (for example, a user channel that creates some BAD playlists as discussed above, spam content, misleading content, repetitive content, pornographic content, and/or any other suitable content), a user channel that has many deleted videos in playlists of the channel, a user channel that is otherwise suitable for demotion in search functions, and/or any other suitable type of channel. In some embodiments, a GOOD channel can correspond to a user channel with GOOD playlists as discussed above (e.g., user channels that organize their own original videos into playlists, music compilation playlists created by official user channels, etc.) and/or any other suitable type of channel. In some embodiments, process 200 can partition and/or rate user channels in any suitable manner.

At 206, process 200 can determine a function that maps average playlist scores to channel scores based on the rating(s) determined in block 204. For example, in some embodiments, process 200 can determine a proportion of SPAM channels and LOW QUALITY channels within each bucket and map channel scores to buckets (e.g., mapping average playlist scores corresponding to the buckets) based on the proportions. In a more particular example, in some embodiments, process 200 can map a channel score of 2.0 to a bucket where the proportion of SPAM channels and LOW QUALITY channels is greater than 90%, map a channel score of 1.5 to a bucket where the proportion of SPAM channels and LOW QUALITY channels is greater than 95%, and map a channel score of 1.0 to a bucket where the proportion of SPAM channels and LOW QUALITY channels is greater than 99%. In some embodiments, process 200 can linearly interpolate channel scores between these mapped channel scores.

Figure 3:
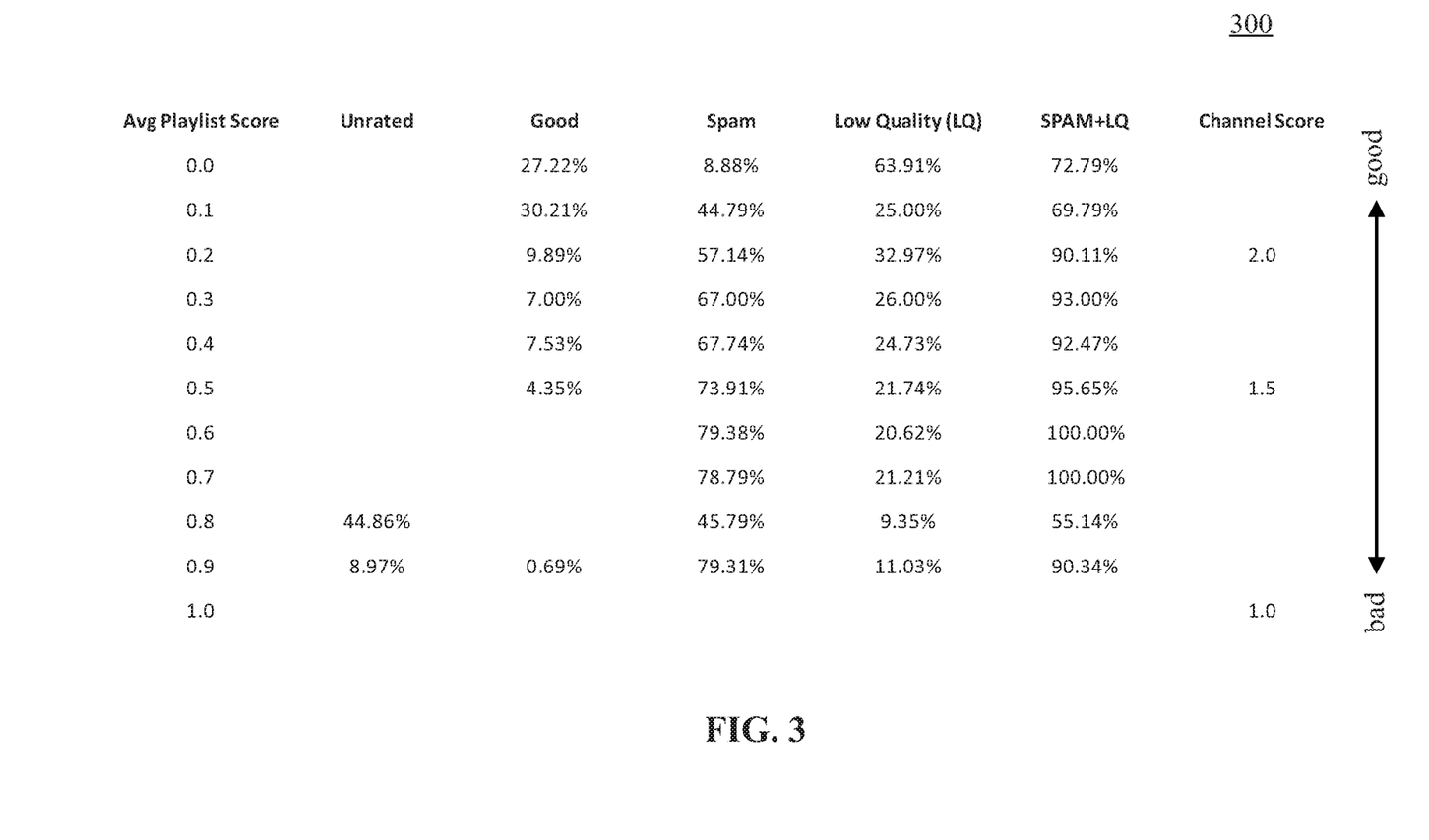
FIG. 3 shows an illustrative example of a table that lists playlist scores, proportions of each user channel rating within a sample of user channels for each bucket corresponding to a 0.1 increment in average playlist score, and channel scores mapped to buckets in accordance with some embodiments of the disclosed subject matter.

In another more particular example, FIG. 3 shows an illustrative example 300 of a table that includes average playlist scores, proportions of each user channel rating within a sample of user channels for each bucket corresponding to a 0.1 increment in average playlist score, and channel scores mapped to buckets in accordance with some embodiments of the disclosed subject matter. In some embodiments, process 200 can derive a function based on table 300, such as the function shown and described in connection with FIG. 4.

Figure 4:
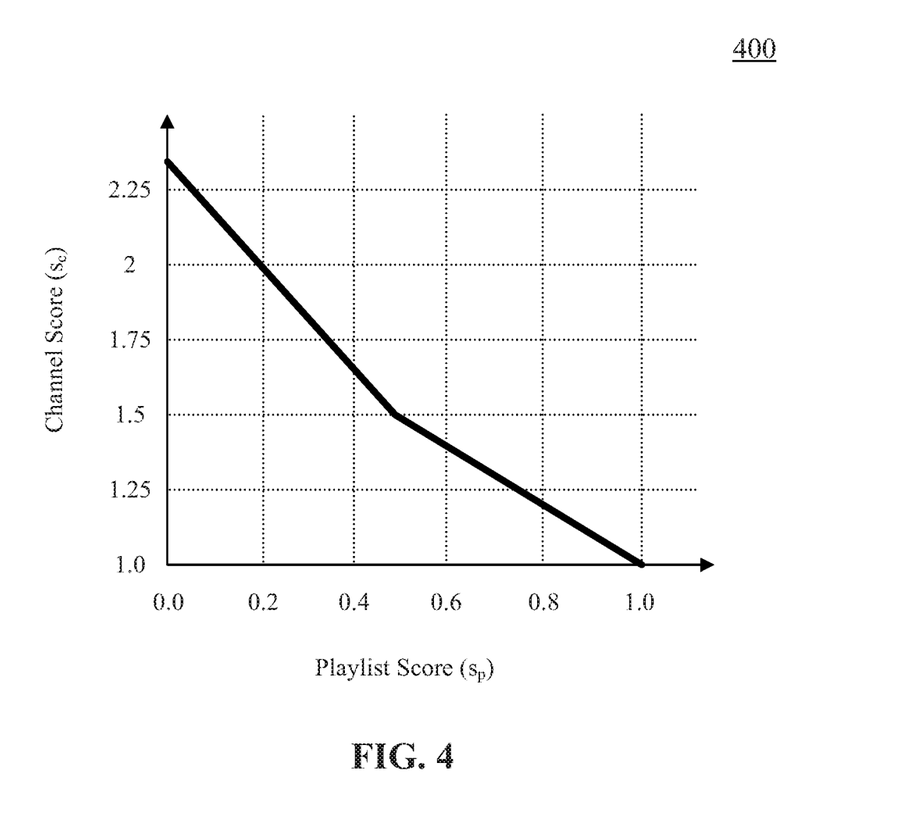
FIG. 4 shows an illustrative example of a function for mapping an average playlist score to a channel score in accordance with some embodiments of the disclosed subject matter.

Turning to FIG. 4, an example 400 of a function for mapping a playlist score(s) $s_p$ to a channel score $s_c$ in accordance with some embodiments of the disclosed subject matter is shown. As illustrated, function 200 is a piecewise linear function defined by the following equation:

$$s_c = \begin{cases} \dfrac{7 - 5s_p}{3} & \text{if } 0 \leq s_p \leq 0.5 \\ 2 - s_p & \text{if } 0.5 < s_p \leq 1 \end{cases}$$

Turning back to FIG. 2, at 208, process 200 can calculate a channel score for each user channel based on the average playlist score and the determined function. For example, in some embodiments, process 200 can determine a channel score that maps to the average playlist score according to the determined function.

In some embodiments, process 100 can perform any suitable action based on the calculated channel score(s).

For example, turning back to FIG. 1, process 100 can demote one or more search results based on the calculated channel score(s) at 112. For example, in some embodiments, process 100 can identify one or more user channels having a calculated channel score below a predetermined threshold (e.g., a channel score that is less than 1.2) and can add the identified user channels to a blacklist. Additionally or alternatively, in some embodiments, process 100 can identify one or more user channels having a calculated channel score below a predetermined threshold (e.g., a channel score that is less than 1.2) and can add one or more content items (e.g., playlists, videos, and/or any other suitable content item) of the user channel to a blacklist. In some embodiments, addition of a user channel and/or a content item to a blacklist can cause one or more content items of the blacklisted user channel and/or the blacklisted content item to automatically be demoted in a set of search results. In some embodiments, demoting a content item can include lowering a rank in which a content item is present in an ordered list of search results, preventing a content item from being presented in a list of search results, preventing monetization of a content item in association with playback of the content item, and/or any other suitable action. As another example, in some embodiments, process 100 can demote search results in any suitable manner, such as in the manner shown and described in connection with FIG. 5.

Figure 5:
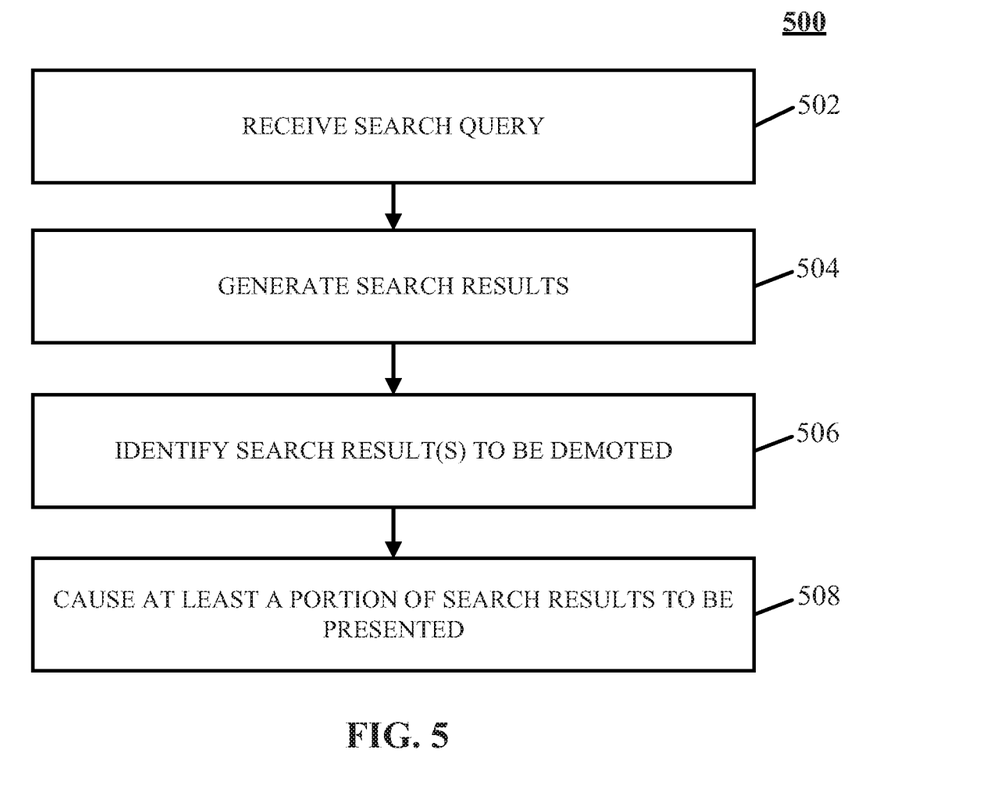
FIG. 5 shows an illustrative example of a process for demoting one or more search results in accordance with some embodiments of the disclosed subject matter.

Turning to FIG. 5, an illustrative example 500 of a process for demoting one or more search results in accordance with some embodiments of the disclosed subject matter is shown. As illustrated, blocks of process 500 can be executed by one or more servers, as shown in and described below in connection with FIGS. 6 and 7, and/or any other suitable computing device(s).

At 502, process 500 can receive a search query. For example, in some embodiments, process 500 can receive a search query for one or more media content items from a user device. In some embodiments, a search query can include one or more search terms and/or any other suitable information.

At 504, process 500 can generate search results in response to receiving the search query. For example, in some embodiments, process 500 can generate search results including one or more content items associated with the search term(s) included in the search query and/or any other suitable information. In some embodiments, each search result can correspond to a different media content item. For example, in some embodiments, a media content item can include video content items (e.g., video clips, movies, video playlists, and/or any other suitable video content items), audio content items (e.g., audio clips, music, audiobooks, audio playlists, and/or any other suitable audio content items), images, and/or any other suitable media content items.

At 506, prior to presenting the search results, process 500 can identify one or more search results to be demoted. For example, in some embodiments, process 500 can determine whether any content items included in the search results is associated with a user channel that is blacklisted. Process 500 can then demote any search result that is associated with a content item determined to be blacklisted in some embodiments. In some embodiments, a content item can be blacklisted when a user channel associated with the content item is blacklisted. Additionally or alternatively, process 500 can demote search results based on the calculated channel scores, the calculated playlist scores, quality scores of each content item associated with each search result, and/or any other suitable information. For example, in some embodiments, process 500 can demote one or more search results associated with a user channel having a channel score below a predetermined threshold (e.g., a channel score that is less than 1.2). As another example, in some embodiments, process 500 can demote one or more search results associated with a playlist having a playlist score above a predetermined threshold (e.g., a playlist score that is greater than 0.8). In some embodiments, process 500 can identify one or more search results to be demoted in any suitable manner.

At 508, process 500 can demote the identified search result(s). For example, in some embodiments, process 500 can cause at least a portion of the generated search results to be presented such that one or more demoted search results are prevented from being presented. Additionally or alternatively, in some embodiments, process 500 can cause at least a portion of the generated search results to be presented such that one or more demoted search results are presented at a lower rank than originally generated. In some embodiments, process 500 can cause the search results to be presented on the user device that sent the search query. In some embodiments, process 500 can demote the identified search result(s) in any suitable manner.

In some embodiments, process 500 can present an indication as to which search results have been demoted. For example, a user interface that presents the portion of search results can include a visual indicator or other user interface element that indicates a search result has been demoted, a search result is associated with a user account that is currently on a blacklist, a search result is associated with a channel score less than a particular value, etc.

Turning back to FIG. 1, it is noted that, in some embodiments, blocks 102-112 can be performed iteratively at a predetermined frequency (e.g., once per day or any other suitable frequency). For example, in some embodiments, process 100 can frequently re-train playlist classifier based on the most recent trends in keywords and abuse patterns, and process 100 can continuously update playlist scores and channel scores to control abuse on a media content platform.

Figure 6:
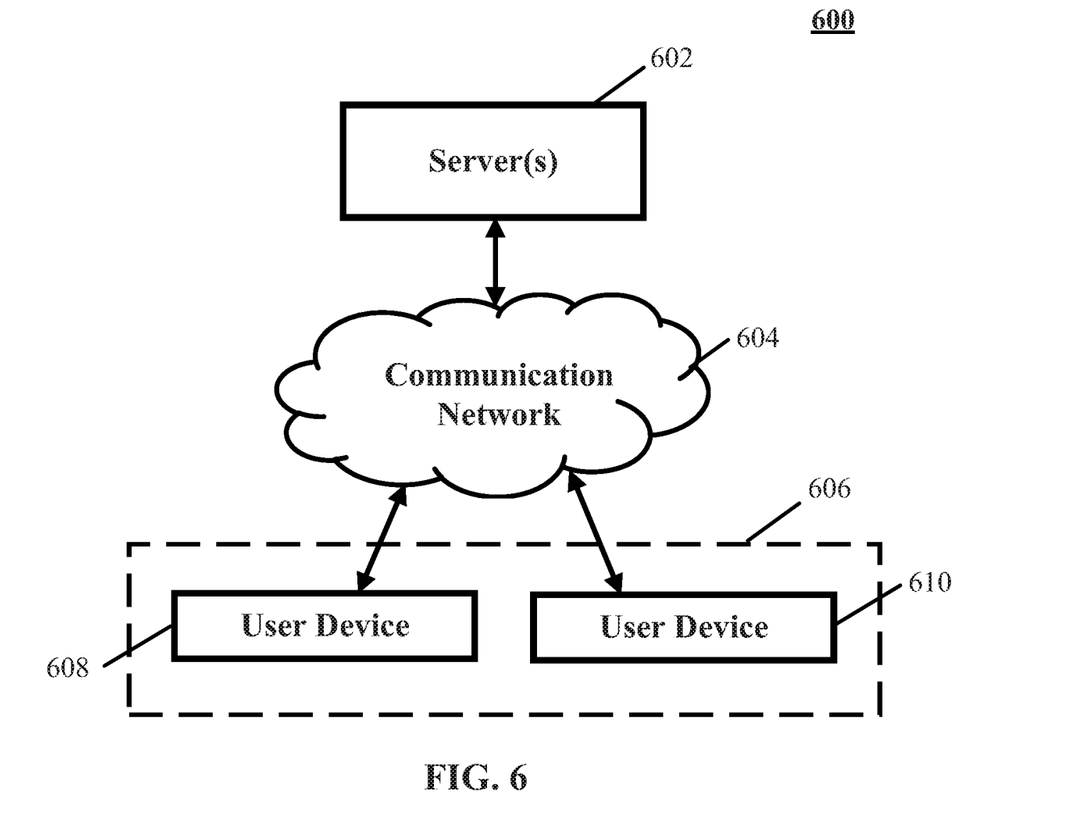
FIG. 6 shows a schematic diagram of an illustrative system suitable for identifying abusive user channels based on playlists in accordance with some embodiments of the disclosed subject matter.

Turning to FIG. 6, an illustrative example 600 of hardware for identifying abusive user channels based on playlists that can be used in accordance with some embodiments of the disclosed subject matter is shown. As illustrated, hardware 600 can include a server(s) 602, a communication network 604, and/or one or more user devices 606, such as user device 608 and user device 610.

Server(s) 602 can be any suitable server for storing information, data, programs, and/or any other suitable type of content for identifying abusive user channels based on playlists. In some embodiments, server(s) 602 can collect signals associated with each playlist, aggregate signals into features, train a playlist classifier, calculate playlist scores, calculate channel scores, and demote search results as described above in connection with FIGS. 1-5.

Communication network 604 can be any suitable combination of one or more wired and/or wireless networks in some embodiments. For example, communication network 604 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, communication network 604 can be linked via one or more communications links to server(s) 602 and/or user device(s) 606. The communications links can be any communications links suitable for communicating data among user device(s) 606 and server(s) 602, such as network links, dial-up links, wireless links, hard-wired links, any other suitable communications links, or any suitable combination of such links.

User device(s) 606 can include any one or more user devices. For example, in some embodiments, user device(s) 606 can include a television, speakers, a mobile phone, a tablet computer, a desktop computer, a laptop computer, a vehicle entertainment system, a wearable computer, and/or any other suitable type of user device. In some embodiments, user device(s) 606 can perform any suitable function(s), such as sending a search query and/or presenting search results, as described above in connection with FIGS. 1 and 5.

Although server(s) 602 is illustrated as one device, the functions performed by server(s) 602 can be performed using any suitable number of devices in some embodiments. For example, in some embodiments, multiple devices can be used to implement the functions performed by server(s) 602.

Although two user devices 608 and 610 are shown in FIG. 6 to avoid over-complicating the figure, any suitable number of user devices, and/or any suitable types of user devices, can be used in some embodiments.

Server(s) 602 and user device(s) 606 can be implemented using any suitable hardware in some embodiments. For example, in some embodiments, devices 602 and 606 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 702 can be controlled by a server program stored in memory and/or storage 704. For example, in some embodiments, the server program can cause hardware processor 702 to collect signals associated with each playlist, aggregate signals into features, train a playlist classifier, calculate playlist scores, calculate channel scores, and demote search results as described above in connection with FIGS. 1-5, and/or perform any other suitable functions.

Figure 7:
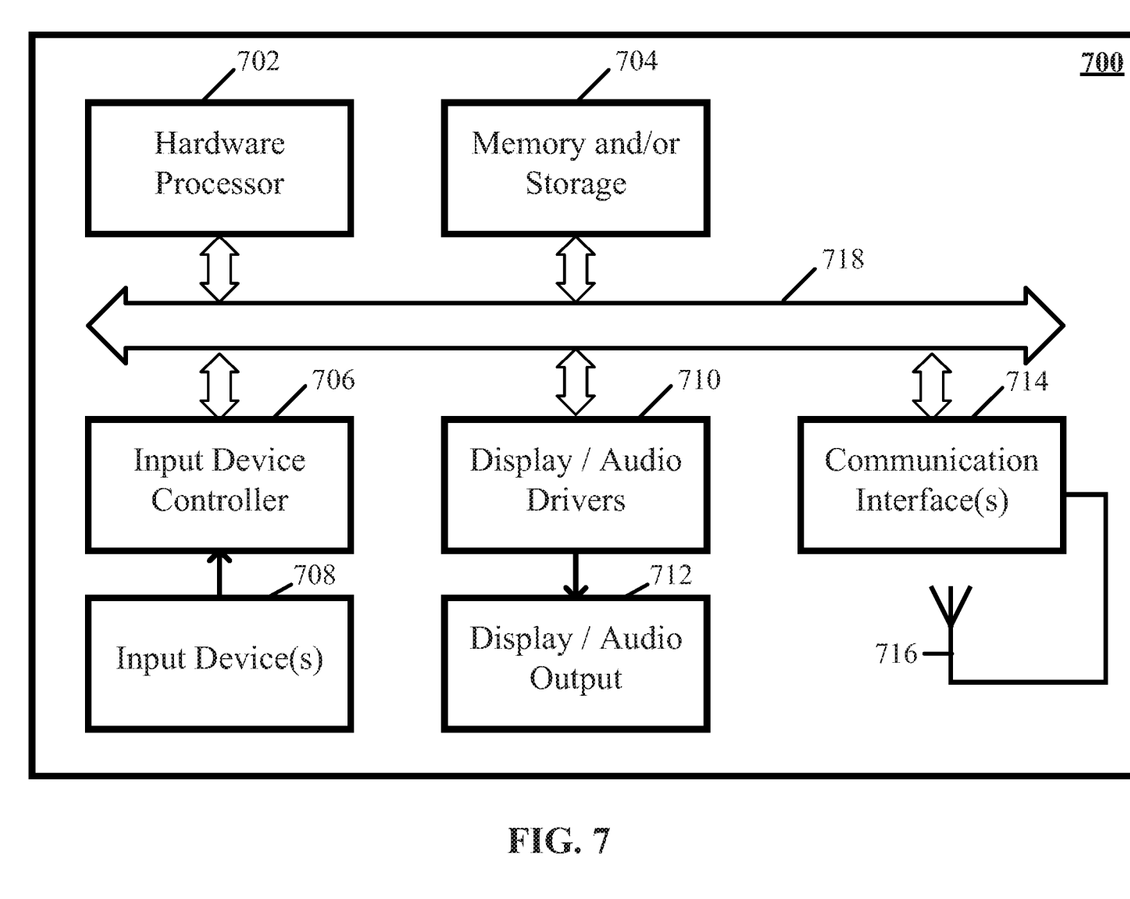
FIG. 7 shows a detailed example of hardware that can be used in a server and/or a user device of FIG. 6 in accordance with some embodiments of the disclosed subject matter.

Memory and/or storage 704 can be any suitable memory and/or storage for storing programs, data, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 706 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks (e.g., communication network 604). For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 604) in some embodiments. In some embodiments, antenna 716 can be omitted.

Bus 718 can be any suitable mechanism for communicating between two or more components 702, 704, 706, 710, and 714 in some embodiments.

Any other suitable components can be included in hardware 700 in accordance with some embodiments.

In some embodiments, at least some of the above described blocks of the processes of FIGS. 1-5 can be executed or performed in any order or sequence not limited to the order and sequence shown in and described in connection with the figures. Also, some of the above blocks of FIGS. 1-5 can be executed or performed substantially simultaneously where appropriate or in parallel to reduce latency and processing times. Additionally or alternatively, some of the above described blocks of the processes of FIGS. 1-5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for identifying abusive user accounts based on playlists are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for identifying abusive content, the method comprising:
   determining, by a hardware processor, at least one feature associated with a playlist created by a user-generated channel, wherein the playlist includes a plurality of content items;
   calculating, by the hardware processor, a playlist score associated with the playlist based on a playlist classifier, wherein the playlist classifier comprises a function that maps the at least one feature to the playlist score, wherein the playlist score represents a relative goodness of the playlist in comparison with a plurality of playlists of content items, wherein a first range of playlist scores represents non-abusive playlists, and wherein a second range of playlist scores represents abusive playlists;
   calculating, by the hardware processor, a channel score associated with the user-generated channel based at least on the calculated playlist score, wherein the channel score represents a relative goodness of the user-generated channel in comparison with a plurality of user-generated channels, wherein a first range of channel scores represents channels that create the non-abusive playlists associated with the first range of playlist scores, and wherein a second range of channel scores represents channels that create the abusive playlists associated with the second range of playlist scores;
   determining, by the hardware processor, that one or more content items associated with the user-generated channel is to be demoted based on the calculated channel score, wherein the one or more content items comprises the playlist; and
   causing, by the hardware processor, the one or more content items to be demoted.

2. The method of claim 1, further comprising:
   determining a set of features associated with a first plurality of playlists; and
   training the playlist classifier based on the determined set of features and a set of ground truth information.

3. The method of claim 1, further comprising:
   determining at least one feature associated with a second plurality of playlists created by the user-generated channel;
   calculating a plurality of playlist scores each associated with a respective playlist of the second plurality of playlists based on the determined at least one feature associated with the second plurality of playlists;
   calculating an average playlist score of the user-generated channel by averaging the plurality of playlist scores; and
   calculating the channel score based on the average playlist score.

4. The method of claim 3, wherein calculating the channel score based on the calculated average playlist score comprises calculating the channel score based on a function that maps the average playlist score to the channel score.

5. The method of claim 4, further comprising:
   calculating a plurality of average playlist scores corresponding to the plurality of user-generated channels;
   partitioning the plurality of user-generated channels into a plurality of partitions based on the plurality of average playlist scores; and
   determining the function that maps the average playlist score to the channel score based on proportions of types of channels in each partition of the plurality of partitions.

6. The method of claim 1, further comprising:
receiving a search query;
generating a plurality of search results in response to the search query, wherein at least a portion of the plurality of search results correspond to the one or more content items; and
causing at least a portion of the plurality of search results to be presented based on the demotion.

7. A system for identifying abusive content, the system comprising:
a hardware processor that is configured to:
determine at least one feature associated with a playlist created by a user-generated channel, wherein the playlist includes a plurality of content items;
calculate a playlist score associated with the playlist based on a playlist classifier, wherein the playlist classifier comprises a function that maps the at least one feature to the playlist score, wherein the playlist score represents a relative goodness of the playlist in comparison with a plurality of playlists of content items, wherein a first range of playlist scores represents non-abusive playlists, and wherein a second range of playlist scores represents abusive playlists;
calculate a channel score associated with the user-generated channel based at least on the calculated playlist score, wherein the channel score represents a relative goodness of the user-generated channel in comparison with a plurality of user-generated channels, wherein a first range of channel scores represents channels that create the non-abusive playlists associated with the first range of playlist scores, and wherein a second range of channel scores represents channels that create the abusive playlists associated with the second range of playlist scores;
determine that one or more content items associated with the user-generated channel is to be demoted based on the calculated channel score, wherein the one or more content items comprises the playlist; and
cause the one or more content items to be demoted.

8. The system of claim 7, wherein the hardware processor is further configured to:
determine a set of features associated with a first plurality of playlists; and
train the playlist classifier based on the determined set of features and a set of ground truth information.

9. The system of claim 7, wherein the hardware processor is further configured to:
determine at least one feature associated with a second plurality of playlists created by the user-generated channel;
calculate a plurality of playlist scores each associated with a respective playlist of the second plurality of playlists based on the determined at least one feature associated with the second plurality of playlists;
calculate an average playlist score of the user-generated channel by averaging the plurality of playlist scores; and
calculate the channel score based on the average playlist score.

10. The system of claim 9, wherein the hardware processor is further configured to calculate the channel score based on a function that maps the average playlist score to the channel score.

11. The system of claim 10, wherein the hardware processor is further configured to:
calculate a plurality of average playlist scores corresponding to the plurality of user-generated channels;
partition the plurality of user-generated channels into a plurality of partitions based on the plurality of average playlist scores; and
determine the function that maps the average playlist score to the channel score based on proportions of types of channels in each partition of the plurality of partitions.

12. The system of claim 7, wherein the hardware processor is further configured to:
receive a search query;
generate a plurality of search results in response to the search query, wherein at least a portion of the plurality of search results correspond to the one or more content items; and
cause at least a portion of the plurality of search results to be presented based on the demotion.

13. A non-transitory computer-readable medium containing computer-executable instructions that, when executed by a processor, cause the processor to perform a method for identifying abusive content, the method comprising:
determining at least one feature associated with a playlist created by a user-generated channel;
calculating a playlist score associated with the playlist based on a playlist classifier, wherein the playlist classifier comprises a function that maps the at least one feature to the playlist score, wherein the playlist score represents a relative goodness of the playlist in comparison with a plurality of playlists, wherein a first range of playlist scores represents non-abusive playlists, and wherein a second range of playlist scores represents abusive playlists;
calculating a channel score associated with the user-generated channel based at least on the calculated playlist score, wherein the channel score represents a relative goodness of the user-generated channel in comparison with a plurality of user-generated channels, wherein a first range of channel scores represents channels that create the non-abusive playlists associated with the first range of playlist scores, and wherein a second range of channel scores represents channels that create the abusive playlists associated with the second range of playlist scores;
determining that one or more content items associated with the user-generated channel is to be demoted based on the calculated channel score, wherein the one or more content items comprises the playlist; and
causing the one or more content items to be demoted.

14. The non-transitory computer-readable medium of claim 13, wherein the method further comprises
determining a set of features associated with a first plurality of playlists; and
training the playlist classifier based on the determined set of features and a set of ground truth information.

15. The non-transitory computer-readable medium of claim 13, wherein the method further comprises:
determining at least one feature associated with a second plurality of playlists created by the user-generated channel;
calculating a plurality of playlist scores each associated with a respective playlist of the second plurality of playlists based on the determined at least one feature associated with the second plurality of playlists;
calculating an average playlist score of the user-generated channel by averaging the plurality of playlist scores; and
calculating the channel score based on the average playlist score.

16. The non-transitory computer-readable medium of claim 15, wherein calculating the channel score based on the calculated average playlist score comprises calculating the channel score based on a function that maps the average playlist score to the channel score.

17. The non-transitory computer-readable medium of claim 16, wherein the method further comprises:
   calculating a plurality of average playlist scores corresponding to the plurality of user-generated channels;
   partitioning the plurality of user-generated channels into a plurality of partitions based on the plurality of average playlist scores; and
   determining the function that maps the average playlist score to the channel score based on proportions of types of channels in each partition of the plurality of partitions.

18. The non-transitory computer-readable medium of claim 13, wherein the method further comprises:
   receiving a search query;
   generating a plurality of search results in response to the search query, wherein at least a portion of the plurality of search results correspond to the one or more content items; and
   causing at least a portion of the plurality of search results to be presented based on the demotion.

* * * * *